(12) United States Patent
Lo et al.

(10) Patent No.: US 11,726,513 B2
(45) Date of Patent: *Aug. 15, 2023

(54) ON-CHIP DUAL-SUPPLY MULTI-MODE CMOS REGULATORS

(71) Applicant: QUALCOMM Incorporated, San Diego, CA (US)

(72) Inventors: Yung-Chung Lo, San Diego, CA (US); Gang Zhang, San Diego, CA (US); Yiping Han, San Diego, CA (US); Frederic Bossu, San Diego, CA (US); Tsai-Pi Hung, San Diego, CA (US); Jae-Hong Chang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 79 days.

This patent is subject to a terminal disclaimer.

(21) Appl. No.: 17/443,093

(22) Filed: Jul. 20, 2021

(65) Prior Publication Data

US 2021/0351696 A1    Nov. 11, 2021

Related U.S. Application Data

(63) Continuation of application No. 14/630,506, filed on Feb. 24, 2015, now Pat. No. 11,095,216.
(Continued)

(51) Int. Cl.
*G05F 1/575* (2006.01)
*H02M 3/156* (2006.01)
*H02M 1/00* (2006.01)

(52) U.S. Cl.
CPC ............ *G05F 1/575* (2013.01); *H02M 3/156* (2013.01); *H02M 1/0077* (2021.05)

(58) Field of Classification Search
CPC ...... H02M 3/156; H02M 1/0077; G05F 1/575
See application file for complete search history.

(56) References Cited

U.S. PATENT DOCUMENTS 5,336,986 A * 8/1994 Allman ............... G05F 3/30
                                              323/354
5,438,542 A   8/1995 Atsumi et al.
(Continued)

FOREIGN PATENT DOCUMENTS

CN    102096434 A    6/2011
CN    102354245 A    2/2012
(Continued)

OTHER PUBLICATIONS

Camacho D., et al., "An NMOS Low Dropout Voltage Regulator with Switched Floating Capacitor Gate Overdrive," Department of Electrical Engineering, Southern Methodist University, Dallas, Texas, USA, 52nd IEEE International Midwest Symposium on Circuits and Systems, Aug. 2009, pp. 808-811.
(Continued)

*Primary Examiner* — Emily P Pham
(74) *Attorney, Agent, or Firm* — Arent Fox, LLP and Qualcomm, Incorporated

(57) ABSTRACT

A method, an apparatus, and a computer program product are provided. The apparatus may be a regulator circuit. The regulator circuit includes a first voltage regulator to regulate a first input voltage to the first voltage regulator, the first voltage regulator including a P-type metal-oxide-semiconductor (PMOS), a second voltage regulator to regulate a second input voltage to the second voltage regulator, and a switch circuit to selectively activate at least one of the first voltage regulator or the second voltage regulator. In one aspect, the second voltage regulator includes an N-type metal-oxide-semiconductor (NMOS). In one aspect, the second voltage regulator comprises a two-stage operational
(Continued)

transconductance amplifier (OTA) circuit. In an aspect, the first voltage regulator is coupled to the second voltage regulator.

17 Claims, 13 Drawing Sheets

Related U.S. Application Data

(60) Provisional application No. 62/005,765, filed on May 30, 2014.

(56) References Cited

U.S. PATENT DOCUMENTS

| | | | |
|---|---|---|---|
| 5,528,127 | A | 6/1996 | Streit |
| 6,469,480 | B2 | 10/2002 | Kanakubo |
| 6,515,880 | B1 | 2/2003 | Evans et al. |
| 6,677,735 | B2 | 1/2004 | Xi |
| 7,064,531 | B1 | 6/2006 | Zinn |
| 7,071,664 | B1 | 7/2006 | Teggatz et al. |
| 7,126,319 | B2 | 10/2006 | Chen |
| 7,145,370 | B2 | 12/2006 | Bernard et al. |
| 7,161,339 | B2 | 1/2007 | Chen et al. |
| 7,177,182 | B2 | 2/2007 | Diorio et al. |
| 7,199,565 | B1 | 4/2007 | Demolli |
| 7,199,567 | B2 | 4/2007 | Eberlein |
| 7,224,156 | B2 | 5/2007 | Chen |
| 7,253,663 | B2 | 8/2007 | Cho et al. |
| 7,531,996 | B2 | 5/2009 | Yang et al. |
| 7,548,093 | B1 | 6/2009 | Priel et al. |
| 7,746,046 | B2 | 6/2010 | Chen |
| 7,994,759 | B2 | 8/2011 | Huang et al. |
| 8,085,014 | B2 | 12/2011 | Kung et al. |
| 8,334,681 | B2 | 12/2012 | Arigliano |
| 8,519,771 | B1 | 8/2013 | Cical et al. |
| 9,013,212 | B2 | 4/2015 | Kumar |
| 9,170,590 | B2 | 10/2015 | Price et al. |
| 9,231,525 | B2* | 1/2016 | Feldman ............... H03F 1/0205 |
| 9,235,225 | B2 | 1/2016 | Price et al. |
| 9,853,540 | B2 | 12/2017 | Aiura et al. |
| 11,095,216 | B2* | 8/2021 | Lo ........................ G05F 1/575 |
| 2005/0040807 | A1 | 2/2005 | Chen |
| 2005/0110477 | A1 | 5/2005 | Mauthe |
| 2005/0242794 | A1 | 11/2005 | Yen et al. |
| 2005/0264960 | A1 | 12/2005 | Alihodzic et al. |
| 2005/0264969 | A1 | 12/2005 | Dement |
| 2006/0170401 | A1 | 8/2006 | Chen et al. |
| 2006/0232255 | A1 | 10/2006 | Haider et al. |
| 2007/0002596 | A1 | 1/2007 | Kenny et al. |
| 2007/0018625 | A1 | 1/2007 | Aikawa |
| 2007/0152758 | A1 | 7/2007 | Shimomura et al. |
| 2009/0033383 | A1 | 2/2009 | Wyatt et al. |
| 2009/0262556 | A1 | 10/2009 | Tomiyoshi et al. |
| 2010/0045249 | A1 | 2/2010 | Park et al. |
| 2010/0141223 | A1 | 6/2010 | Wadhwa |
| 2010/0264964 | A1 | 10/2010 | Furuta |
| 2012/0161745 | A1 | 6/2012 | Manohar et al. |
| 2013/0059554 | A1 | 3/2013 | Ripley et al. |
| 2013/0169246 | A1 | 7/2013 | Shao |
| 2014/0057575 | A1 | 2/2014 | Ayukawa |
| 2014/0084896 | A1 | 3/2014 | Zhang et al. |
| 2014/0145760 | A1 | 5/2014 | Nguyen et al. |
| 2014/0218112 | A1* | 8/2014 | Brantley ................ H03F 1/223 330/254 |
| 2014/0253082 | A1 | 9/2014 | Swanson et al. |

FOREIGN PATENT DOCUMENTS

| | | |
|---|---|---|
| CN | 102609023 A | 7/2012 |
| CN | 103647449 A | 3/2014 |
| JP | 2001159921 A | 6/2001 |
| JP | 2005346430 A | 12/2005 |
| JP | 2012147648 A | 8/2012 |
| JP | 2013504251 A | 2/2013 |
| WO | 2010068682 | 6/2010 |
| WO | 2011099965 A1 | 8/2011 |

OTHER PUBLICATIONS

Camacho D., et al., "Fully On-Chip Switched Capacitor NMOS Low Dropout Voltage Regulator", Analog Integrated Circuits and Signal Processing, Dec. 22, 2009, 9 Pages.

Desai S., et al., "A Dual-Supply 0.2-to4GHz PLL Clock Multiplier in a 65nm Dual-Oxide CMOS Process", PA Semi; ISSCC 2007; Session 17, Analog Techniques and PLLs, 17.4, 2007 IEEE International Solid-State Circuits Conference, Feb. 13, 2007, pp. 308-309, 605.

International Preliminary Report on Patentability—PCT/US2015/030948, The International Bureau of WIPO—Geneva, Switzerland, dated May 19, 2016.

International Search Report and Written Opinion—PCT/US2015/030948—ISA/EPO—dated Jul. 28, 2015.

Kamal Z., et al., "Full on-Chip CMOS Low Dropout Voltage Regulator With −41 DB at 1 MHZ for Wireless Applications," Journal of Theoretical and Applied Information Technology, Dec. 20, 2013, vol. 58 (2), pp. 319-326.

Lu S H., et al., "A Fast Settling Low Dropout Linear Regulator with Single Miller Compensation Capacitor", A-SSCC 2005 : 2005 IEEE Asian Solid-State Circuits Conference ; Nov. 1-3, 2005, Hsinchu, Taiwan, IEEE, Piscataway, NJ, Nov. 1, 2005(Nov. 1, 2005), pp. 153-156, XP031019767, ISBN: 978-9-7803-9162-8 the whole document.

Maity A., et al., "On-Chip Voltage Regulator with Improved Transient Response", 18th International Conference on VLSI Design held jointly with 4th International Conference on Embedded Systems Design (VLSID'05), IEEE, Jan. 3-7, 2005, 6 Pages.

MAK P-I., et al., "High-/Mixed-Voltage RF and Analog CMOS Circuits Come of Age", IEEE Circuits and Systems Magazine; Fourth Quarter 2010, pp. 27-39.

Zhan C., et al., "A Low Dropout Regulator for SoC with High Power Supply Rejection and Low Quiescent Current", International Symposium on Integrated Circuits (ISIC) 2009, pp. 37-40.

European Search Report—EP22197509—Search Authority—Munich—dated Nov. 18, 2022.

* cited by examiner

ON-CHIP DUAL-SUPPLY MULTI-MODE CMOS REGULATORS

CROSS-REFERENCE TO RELATED APPLICATION(S)

This application is a continuation of U.S. application Ser. No. 14/630,506 filed on Feb. 24, 2015 which claims the benefit of U.S. Provisional Application Ser. No. 62/005,765, entitled "ON-CHIP DUAL-SUPPLY MULTI-MODE CMOS REGULATORS" and filed on May 30, 2014, which are expressly incorporated by reference herein in their entirety.

BACKGROUND

Field

The present disclosure relates generally to communication systems, and more particularly, to a voltage regulator for a voltage controlled oscillator (VCO).

Background

A wireless device (e.g., a cellular phone or a smart phone) may transmit and receive data for two-way communication with a wireless communication system. The wireless device may include a transmitter for data transmission and a receiver for data reception. For data transmission, the transmitter may modulate a transmit local oscillator (LO) signal with data to obtain a modulated radio frequency (RF) signal, amplify the modulated RF signal to obtain an output RF signal having the desired output power level, and transmit the output RF signal via an antenna to a base station. For data reception, the receiver may obtain a received RF signal via the antenna, amplify and downconvert the received RF signal with a receive LO signal, and process the downconverted signal to recover data sent by the base station.

The wireless device may include one or more oscillators to generate one or more oscillator signals at one or more desired frequencies. The oscillator signal(s) may be used to generate the transmit LO signal for the transmitter and the receive LO signal for the receiver. The oscillator(s) may be required to generate the oscillator signal(s) to meet the requirements of the wireless communication system with which the wireless device communicates.

A VCO is used to generate the transmit LO signal and the receive LO signal. A VCO is generally connected to a regulator that provides an input voltage to the VCO. The performance of the VCO may depend on the regulator. Therefore, an effective regulator for the VCO is desired for optimal performance and low noise.

SUMMARY

In an aspect of the disclosure, a method and an apparatus are provided. The apparatus may be a regulator circuit. The regulator circuit includes a first voltage regulator to regulate a first input voltage to the first voltage regulator, the first voltage regulator including a P-type metal-oxide-semiconductor (PMOS), and a second voltage regulator to regulate a second input voltage to the second voltage regulator, the second voltage regulator including an N-type metal-oxide-semiconductor (NMOS). In one aspect, the second voltage regulator comprises a two-stage operational transconductance amplifier (OTA) circuit. In an aspect, the first voltage regulator is coupled to the second voltage regulator. In an aspect, the regulator circuit may further include a switch circuit to selectively activate at least one of the first voltage regulator or the second voltage regulator. In an aspect, the first voltage regulator and the second voltage regulator are connected in series. In an aspect, the first voltage regulator and the second voltage regulator are connected in parallel. In an aspect, the first voltage regulator includes a two-stage amplifier circuit to amplify the first input voltage in two stages. In an aspect, the second voltage regulator circuit includes a two-stage amplifier circuit to amplify the second input voltage in two stages. In an aspect, the second voltage regulator includes a pole-cancelation circuit. In an aspect, the second voltage regulator includes a capacitor and a resistor, and wherein one end of the resistor is connected to the capacitor and another end of the resistor is connected to a source of the NMOS. In an aspect, the first voltage regulator and the second voltage regulator are tunable to change a degree of input voltage regulation.

DETAILED DESCRIPTION

Figure 1:
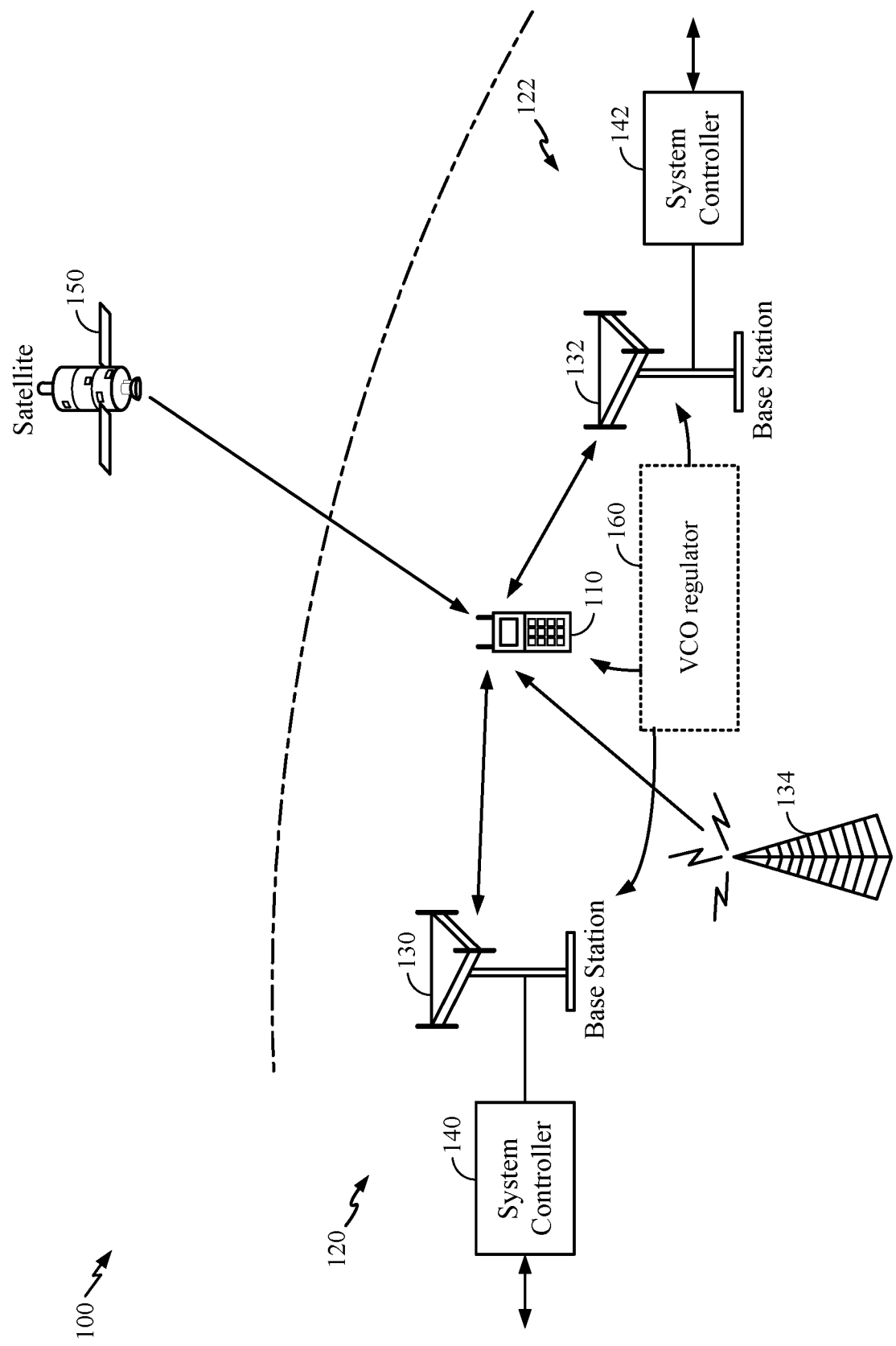
FIG. 1 illustrates a wireless device communicating with different wireless communication systems.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts. The term "exemplary" is used herein to mean "serving as an example, instance, or illustration." Any design described herein as "exemplary" is not necessarily to be construed as preferred or advantageous over other designs.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise random-access memory (RAM), read-only memory (ROM), electronically erasable programmable ROM (EEPROM), compact disk (CD) ROM (CD-ROM), or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, digital versatile disc (DVD), and floppy disk where disks usually reproduce data magnetically, while discs reproduce data optically with lasers. Combinations of the above should also be included within the scope of computer-readable media.

FIG. 1 is a diagram 100 illustrating a wireless device 110 communicating with different wireless communication systems 120, 122. The wireless communication systems 120, 122 may each be a Code Division Multiple Access (CDMA) system, a Global System for Mobile Communications (GSM) system, a Long Term Evolution (LTE) system, a wireless local area network (WLAN) system, or some other wireless system. A CDMA system may implement Wideband CDMA (WCDMA), CDMA 1× or cdma2000, Time Division Synchronous Code Division Multiple Access (TD-SCDMA), or some other version of CDMA. TD-SCDMA is also referred to as Universal Terrestrial Radio Access (UTRA) Time Division Duplex (TDD) 1.28 Mcps Option or Low Chip Rate (LCR). LTE supports both frequency division duplexing (FDD) and time division duplexing (TDD). For example, the wireless communication system 120 may be a GSM system, and the wireless communication system 122 may be a WCDMA system. As another example, the wireless communication system 120 may be an LTE system, and the wireless communication system 122 may be a CDMA system.

For simplicity, the diagram 100 shows the wireless communication system 120 including one base station 130 and one system controller 140, and the wireless communication system 122 including one base station 132 and one system controller 142. In general, each wireless system may include any number of base stations and any set of network entities. Each base station may support communication for wireless devices within the coverage of the base station. The base stations may also be referred to as a Node B, an evolved Node B (eNB), an access point, a base transceiver station, a radio base station, a radio transceiver, a transceiver function, a basic service set (BSS), an extended service set (ESS), or some other suitable terminology. The wireless device 110 may also be referred to as a user equipment (UE), a mobile device, a remote device, a wireless device, a wireless communications device, a station, a mobile station, a subscriber station, a mobile subscriber station, a terminal, a mobile terminal, a remote terminal, a wireless terminal, an access terminal, a client, a mobile client, a mobile unit, a subscriber unit, a wireless unit, a remote unit, a handset, a user agent, or some other suitable terminology. The wireless device 110 may be a cellular phone, a smartphone, a tablet, a wireless modem, a personal digital assistant (PDA), a handheld device, a laptop computer, a smartbook, a netbook, a cordless phone, a wireless local loop (WLL) station, or some other similar functioning device.

The wireless device 110 may be capable of communicating with the wireless communication system 120 and/or 122. The wireless device 110 may also be capable of receiving signals from broadcast stations, such as the broadcast station 134. The wireless device 110 may also be capable of receiving signals from satellites, such as the satellite 150, in one or more global navigation satellite systems (GNSS). The wireless device 110 may support one or more radio technologies for wireless communication such as GSM, WCDMA, cdma2000, LTE, 802.11, etc. The terms "radio technology," "radio access technology," "air interface," and "standard" may be used interchangeably.

The wireless device 110 may communicate with a base station in a wireless system via the downlink and the uplink. The downlink (or forward link) refers to the communication link from the base station to the wireless device, and the uplink (or reverse link) refers to the communication link from the wireless device to the base station. A wireless system may utilize TDD and/or FDD. For TDD, the downlink and the uplink share the same frequency, and downlink transmissions and uplink transmissions may be sent on the same frequency in different time periods. For FDD, the downlink and the uplink are allocated separate frequencies. Downlink transmissions may be sent on one frequency, and uplink transmissions may be sent on another frequency. Some exemplary radio technologies supporting TDD include GSM, LTE, and TD-SCDMA. Some exemplary radio technologies supporting FDD include WCDMA, cdma2000, and LTE. The wireless device 110 and/or the base stations 130, 132 may include an exemplary VCO regulator 160. A VCO regulator 160 is provided infra.

Figure 2:
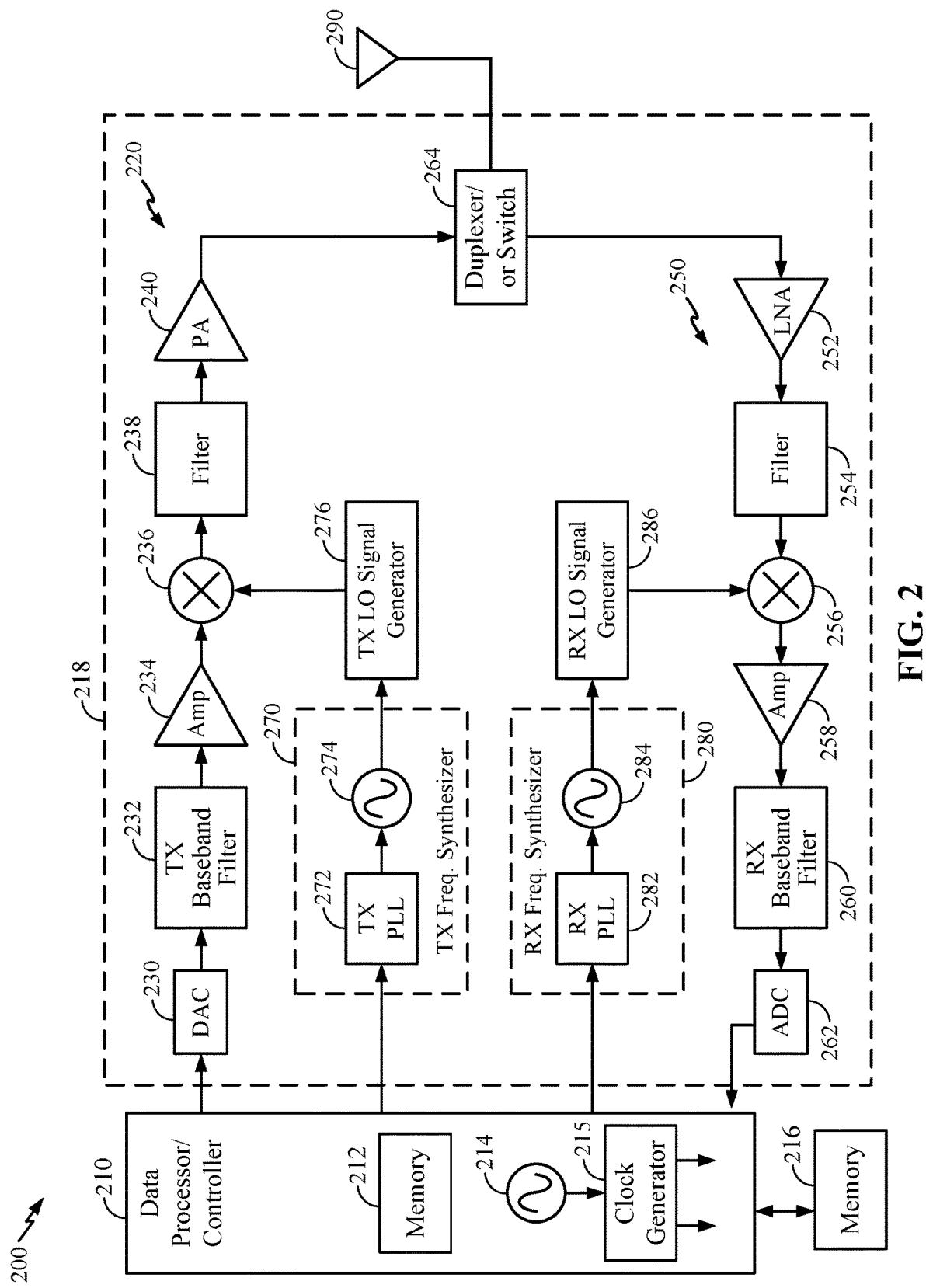
FIG. 2 is a block diagram of a wireless device.

FIG. 2 is a block diagram 200 of an exemplary wireless device, such as the wireless device 110. The wireless device includes a data processor/controller 210, a transceiver 218, and an antenna 290. The data processor/controller 210 may be referred to as a processing system. A processing system may include the data processor/controller 210 or both the data processor/controller 210 and the memory 216. The transceiver 218 includes a transmitter 220 and a receiver 250 that support bi-directional communication. The transmitter 220 and/or the receiver 250 may be implemented with a super-heterodyne architecture or a direct-conversion architecture. In the super-heterodyne architecture, a signal is frequency converted between RF and baseband in multiple stages, e.g., from RF to an intermediate frequency (IF) in one stage, and then from IF to baseband in another stage for a receiver. In the direct-conversion architecture, which is also referred to as a zero-IF architecture, a signal is frequency converted between RF and baseband in one stage. The super-heterodyne and direct-conversion architectures may use different circuit blocks and/or have different requirements. In the exemplary design shown in FIG. 2, the transmitter 220 and the receiver 250 are implemented with the direct-conversion architecture.

In the transmit path, the data processor/controller 210 may process (e.g., encode and modulate) data to be transmitted and provide the data to a digital-to-analog converter (DAC) 230. The DAC 230 converts a digital input signal to an analog output signal. The analog output signal is provided to a transmit (TX) baseband (lowpass) filter 232, which may filter the analog output signal to remove images caused by the prior digital-to-analog conversion by the DAC 230. An amplifier (amp) 234 may amplify the signal from the TX baseband filter 232 and provide an amplified baseband signal. An upconverter (mixer) 236 may receive the amplified baseband signal and a TX LO signal from a TX LO signal generator 276. The upconverter 236 may upconvert the amplified baseband signal with the TX LO signal and provide an upconverted signal. A filter 238 may filter the upconverted signal to remove images caused by the frequency upconversion. A power amplifier (PA) 240 may amplify the filtered RF signal from the filter 238 to obtain the desired output power level and provide an output RF signal. The output RF signal may be routed through a duplexer/switchplexer 264.

For FDD, the transmitter 220 and the receiver 250 may be coupled to the duplexer 264, which may include a TX filter for the transmitter 220 and a receive (RX) filter for the receiver 250. The TX filter may filter the output RF signal to pass signal components in a transmit band and attenuate signal components in a receive band. For TDD, the transmitter 220 and the receiver 250 may be coupled to switchplexer 264. The switchplexer 264 may pass the output RF signal from the transmitter 220 to the antenna 290 during uplink time intervals. For both FDD and TDD, the duplexer/switchplexer 264 may provide the output RF signal to the antenna 290 for transmission via a wireless channel.

In the receive path, the antenna 290 may receive signals transmitted by base stations and/or other transmitter stations and may provide a received RF signal. The received RF signal may be routed through duplexer/switchplexer 264. For FDD, the RX filter within the duplexer 264 may filter the received RF signal to pass signal components in a receive band and attenuate signal components in the transmit band. For TDD, the switchplexer 264 may pass the received RF signal from the antenna 290 to the receiver 250 during downlink time intervals. For both FDD and TDD, the duplexer/switchplexer 264 may provide the received RF signal to the receiver 250.

Within the receiver 250, the received RF signal may be amplified by a low noise amplifier (LNA) 252 and filtered by a filter 254 to obtain an input RF signal. A downconverter (mixer) 256 may receive the input RF signal and an RX LO signal from an RX LO signal generator 286. The downconverter 256 may downconvert the input RF signal with the RX LO signal and provide a downconverted signal. The downconverted signal may be amplified by an amplifier 258 and further filtered by an RX baseband (lowpass) filter 260 to obtain an analog input signal. The analog input signal is provided to an analog-to-digital converter (ADC) 262. The ADC 262 converts an analog input signal to a digital output signal. The digital output signal is provided to the data processor/controller 210.

A TX frequency synthesizer 270 may include a TX phase locked loop (PLL) 272 and a VCO 274. The VCO 274 may generate a TX VCO signal at a desired frequency. The TX PLL 272 may receive timing information from the data processor/controller 210 and generate a control signal for the VCO 274. The control signal may adjust the frequency and/or the phase of the VCO 274 to obtain the desired frequency for the TX VCO signal. The TX frequency synthesizer 270 provides the TX VCO signal to the TX LO signal generator 276. The TX LO signal generator may generate a TX LO signal based on the TX VCO signal received from the TX frequency synthesizer 270.

A RX frequency synthesizer 280 may include an RX PLL 282 and a VCO 284. The VCO 284 may generate an RX VCO signal at a desired frequency. The RX PLL 282 may receive timing information from the data processor/controller 210 and generate a control signal for the VCO 284. The control signal may adjust the frequency and/or the phase of the VCO 284 to obtain the desired frequency for the RX VCO signal. The RX frequency synthesizer 280 provides the RX VCO signal to the RX LO signal generator 286. The RX LO signal generator may generate an RX LO signal based on the RX VCO signal received from the RX frequency synthesizer 280.

The LO signal generators 276, 286 may each include frequency dividers, buffers, etc. The LO signal generators 276, 286 may be referred to as frequency dividers if they divide a frequency provided by the TX frequency synthesizer 270 and the RX frequency synthesizer 280, respectively. The PLLs 272, 282 may each include a phase/frequency detector, a loop filter, a charge pump, a frequency divider, etc. Each VCO signal and each LO signal may be a periodic signal with a particular fundamental frequency. The TX LO signal and the RX LO signal from the LO signal generators 276, 286 may have the same frequency for TDD or different frequencies for FDD. The TX VCO signal and the RX VCO signal from the VCOs 274, 284 may have the same frequency (e.g., for TDD) or different frequencies (e.g., for FDD or TDD).

The conditioning of the signals in the transmitter 220 and the receiver 250 may be performed by one or more stages of amplifier, filter, upconverter, downconverter, etc. These circuits may be arranged differently from the configuration shown in FIG. 2. Furthermore, other circuits not shown in FIG. 2 may also be used to condition the signals in the transmitter 220 and the receiver 250. For example, impedance matching circuits may be located at the output of the PA 240, at the input of the LNA 252, between the antenna 290 and the duplexer/switchplexer 264, etc. Some circuits in FIG. 2 may also be omitted. For example, the filter 238 and/or the filter 254 may be omitted. All or a portion of the transceiver 218 may be implemented on one or more analog integrated circuits (ICs), RF ICs (RFICs), mixed-signal ICs, etc. For example, the TX baseband filter 232 to the PA 240 in the transmitter 220, the LNA 252 to the RX baseband filter 260 in the receiver 250, the PLLs 272, 282, the VCOs 274, 284, and the LO signal generators 276, 286 may be implemented on an RFIC. The PA 240 and possibly other circuits may also be implemented on a separate IC or a circuit module.

The data processor/controller 210 may perform various functions for the wireless device. For example, the data processor/controller 210 may perform processing for data being transmitted via the transmitter 220 and received via the receiver 250. The data processor/controller 210 may control the operation of various circuits within the transmitter 220 and the receiver 250. The memory 212 and/or the memory 216 may store program codes and data for the data processor/controller 210. The memory may be internal to the data processor/controller 210 (e.g., the memory 212) or external to the data processor/controller 210 (e.g., the memory 216). The memory may be referred to as a computer-readable medium. An oscillator 214 may generate a VCO signal at a particular frequency. A clock generator 215 may receive the VCO signal from the oscillator 214 and may generate clock signals for various modules within the data processor/controller 210. The data processor/controller 210 may be implemented on one or more application specific integrated circuits (ASICs) and/or other ICs.

Frequency dividers, such as the frequency dividers in LO signal generators 276, 286, are used extensively for generating LO signals. There is a need for a programmable frequency divider for generating LO signals in multi-band cellular transceivers that meets stringent LO requirements such as small chip area, good phase noise requirement, and quadrature output.

A VCO (e.g., VCO 274 or VCO 284 of FIG. 2) is sensitive to noise spikes and spurs. Thus, a power management integrated circuit (PMIC) is generally used for the VCO to address such an issue. Based on a PMIC noise/spur profile, a power supply rejection ratio (PSRR) of at least 40 dB at 1 MHz is generally desired. For example, a spur (e.g., a spike) of noise is observed between 100 kHz and 1 MHz in the PMIC noise/spur profile. Thus, there is a demand for an effective VCO regulator that is capable of providing a good bandwidth (e.g., a wide bandwidth) and attenuating the spur (e.g., the large spike) for the VCO. It is noted that, although a wider PSRR bandwidth may provide improved performance of a VCO regulator, increasing the PSRR bandwidth may also cause the noise bandwidth to increase. Therefore, there is a trade-off between increasing the PSRR bandwidth and increasing noise bandwidth that is not desirable.

For a VCO to obtain desired power/phase noise conditions, the VCO may implement a VCO regulator with a dual supply configuration to supply voltage. The dual supply configuration may alleviate supply/electromagnetic pulling of the VCO. For example, the dual voltage supply configuration may supply high voltage (HV) for a GSM mode and may supply low voltage (LV) for a non-GSM mode (e.g., for CDMA, LTE, etc.). For an LV non-GSM mode, a specific LV PSRR for low voltage is a concern for satisfactory performance of a VCO regulator because the voltage supplied to the VCO regulator is low in the LV non-GSM mode. For example, in the LV non-GSM mode supplying low voltage, to mitigate PMIC pulse-frequency modulation (PFM) spurs, a VCO regulator should provide an LV PSRR of approximately 100 dB in several hundreds KHz to MHz range with dropout voltage of less than 100 mV. Example simulation results illustrate that for the LV non-GSM mode, a PSRR of approximately 100 dB is desired at 100 KHz to mitigate the PMIC PFM spurs. For an HV GSM mode, good noise performance is a concern for satisfactory performance of a VCO regulator because a high voltage supplied to the VCO regulator may increase the noise bandwidth. For example, in the HV GSM mode supplying high voltage, the VCO regulator provides a certain PSRR at a frequency of several tens of MHz range, while maintaining low noise for the high voltage.

It is desired that a VCO regulator be programmable (e.g., tunable) to satisfy various PSRR/noise specifications and to adapt to the tradeoff between the PSRR and the noise. For example, the VCO regulator should be programmable to provide different PSRR and noise characteristics for different uses. Thus, for example, the VCO regulator should be programmable to provide different PSRR and noise characteristics depending on whether the mode is the LV mode or the HV mode.

It is noted that performance of the VCO regulator is related to a type of a pass element (e.g., DC bias, input/output impedance). In general, an N-type metal-oxide-semiconductor (NMOS) regulator is limited by a DC bias condition and a P-type metal-oxide-semiconductor (PMOS) regulator has a worse PSRR than the NMOS regulator. Table 1 illustrates comparison between an NMOS regulator and a PMOS regulator. In Table 1, a number of plus signs (+) represents a degree of desirable performance, and a number of minus signs (−) represents a degree of undesirable performance.

TABLE 1

Comparison between an NMOS regulator and a PMOS regulator

| Regulator type | PSRR @low freq. | PSRR @high freq. | Rin @low freq | Rin @high freq | Area | Noise |
| --- | --- | --- | --- | --- | --- | --- |
| NMOS 1VDD | ++ | ++ | ++ | + | − | + |
| NMOS 2VDD | + | ++ | ++ | + | − | + |
| PMOS 1VDD | ++ | −− | + | − | ++ | − |
| PMOS 2VDD | − | −− | + | − | ++ | − |

Figure 3:
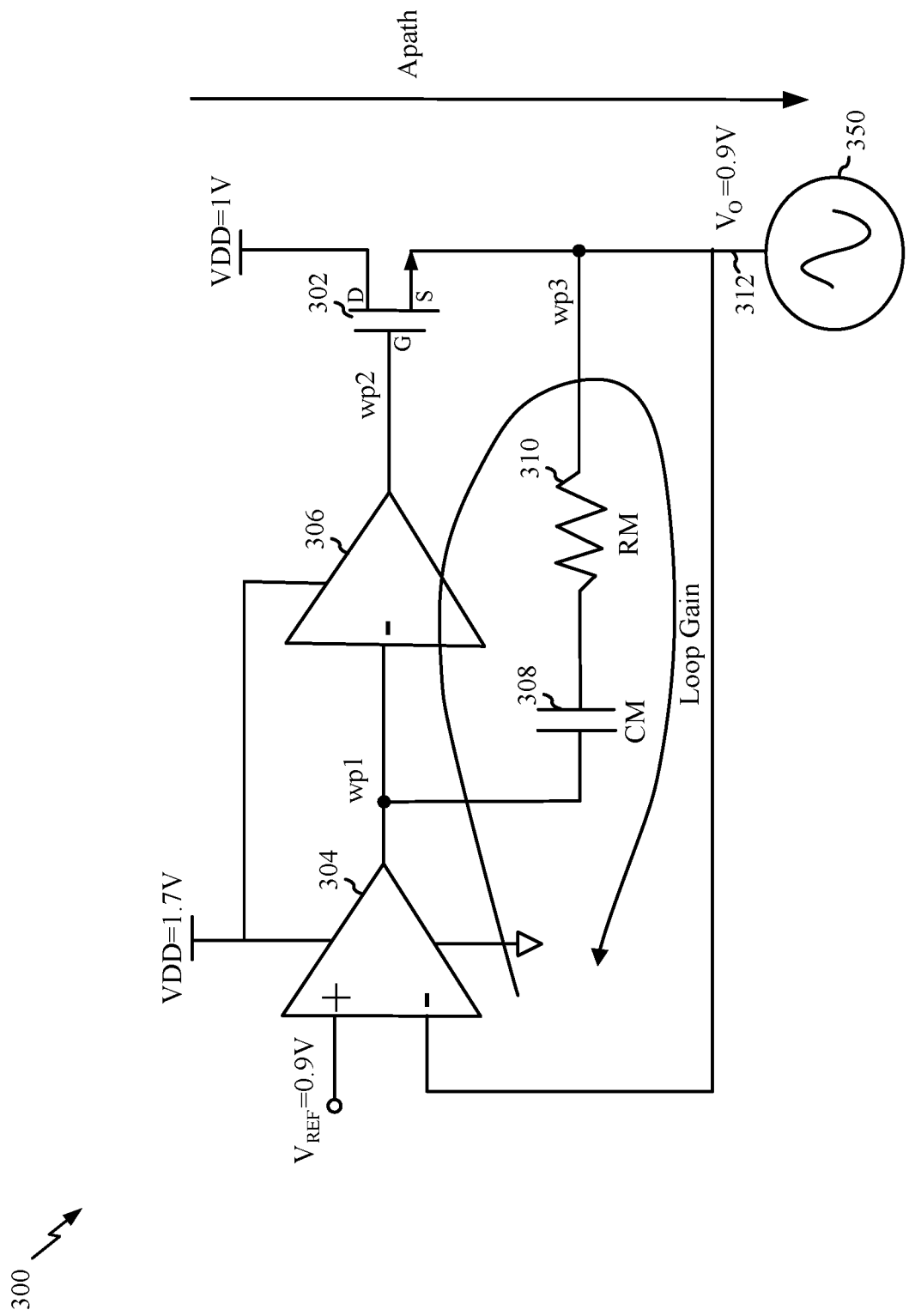
FIG. 3 is an example circuit diagram of an NMOS regulator according to the disclosure.

The NMOS regulator according to the disclosure implements a two-stage operational transconductance amplifier (OTA) circuit to obtain a desirable PSRR (e.g., 100 dB). The two-stage OTA circuit may limit the bandwidth to obtain 100 dB at 100 kHz via a compensation network. The compensation network in the two-stage OTA circuit also provides pole cancellation. FIG. 3 is an example circuit diagram 300 of an NMOS regulator according to the disclosure. The NMOS regulator 300 includes an NMOS 302. The NMOS 302 has a source (S), a drain (D), and a gate (G). The NMOS regulator 300 includes a first amplifier 304 and a second amplifier 306 to provide a two-stage OTA circuit. The second amplifier 306 may be a common source amplifier. For example, a PSSR of 60-70 dB may be achieved in the first stage through the first amplifier 304, and a PSSR of 30-40 dB may be achieved in the second stage through the second amplifier 306, thereby achieving a total PSSR of approximately 100 dB for the two-stage OTA circuit. An output of the first amplifier 304 is connected to an input of the second amplifier 306, and the output of the second amplifier 306 is connected to the gate (G) of the NMOS 302. The output of the first amplifier 304 is also connected to a capacitor 308 with capacitance CM at a first end of the capacitor 308. A second end of the capacitor 308 is connected to a first end of a resistor 310 with resistance RM. A second end of the resistor 310 is connected to the source (S) of the NMOS 302 and a VCO 350. The VCO 350 may be equivalent to the VCO 274 or the VCO 284 of FIG. 2.

The capacitor 308 and the resistor 310 form a compensation network to compensate the regulator output 312 to the output of the first stage OTA circuit including the first amplifier 304. The capacitor 308 and the resistor 310 may be matched with transconductance (Gm) of the first stage OTA circuit. For example, the compensation network including the capacitor 308 and the resistor 310 may be tunable to match with the Gm of the first stage OTA circuit for stability and to minimize noise. It is noted that both the compensation network and the first stage OTA circuit are tunable to match with each other. Because at least one of the compensation network or the first stage OTA circuit is tunable, the regulator can maintain good stability, good regulator bandwidth, and lower noise. It is noted that, if the first stage OTA Gm is larger, the compensation network provides a stronger compensation, and thus provides better stability.

The following equations provide computation of the PSRR according to the example illustrated in FIG. 3. $A_{path}$ is a gain through $A_{path}$ shown in FIG. 3. s is jω). A is a DC gain from a supply to the regulator output 312. A2 is a DC gain at the second amplifier 306. ro1 is output resistance of the first amplifier 304. $\omega_{p1}$ is a pole at the output of the first amplifier 304, $\omega_{p2}$ is a pole at the output of the second amplifier 306, and $\omega_{p3}$ is a pole at the output 312 of the NMOS regulator. $\omega_z$ is a zero generated by the compensation network with the resistor 310 and the capacitor 308. $A_{LP}$ is an open loop DC gain from the input of first amplifier 304 to the regulator output 312.

$$A_{path} \approx \frac{A\left(1 + \frac{s}{\omega_z}\right)}{1 + \frac{s}{\omega_{p1}}}, \omega_{p1} = \frac{1}{A2 \cdot CM \cdot ro1}, \omega_z = \frac{1}{CM \cdot ro1} \quad (1)$$

$$LoopGain \approx \frac{A_{LP}}{\left(1 + \frac{s}{\omega_{p1}}\right)\left(1 + \frac{s}{\omega_{p2}}\right)\left(1 + \frac{s}{\omega_{p3}}\right)} \quad (2)$$

$$PSRR \approx \frac{A_{path}}{1 + LoopGain} = \frac{\frac{A\left(1 + \frac{s}{\omega_z}\right)}{\left(1 + \frac{s}{\omega_{p1}}\right)}}{1 + \frac{A_{LP}}{\left(1 + \frac{s}{\omega_{p1}}\right)\left(1 + \frac{s}{\omega_{p2}}\right)\left(1 + \frac{s}{\omega_{p3}}\right)}} = \quad (3)$$

$$\frac{A\left(1 + \frac{s}{\omega_z}\right)\left(1 + \frac{s}{\omega_{p2}}\right)}{A_{LP} + \left(1 + \frac{s}{\omega_{p1}}\right)\left(1 + \frac{s}{\omega_{p2}}\right)\left(1 + \frac{s}{\omega_{p3}}\right)}$$

Figure 4A:
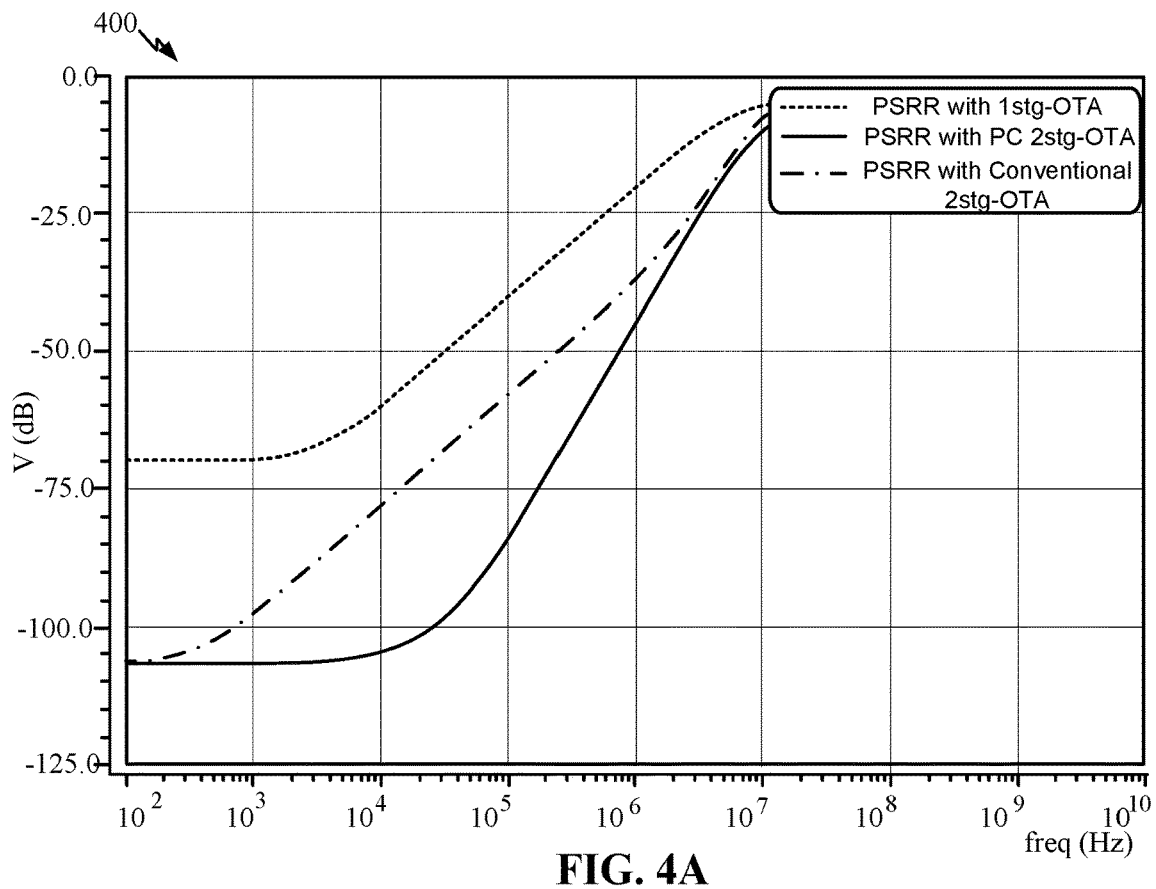
FIG. 4A is an example PSSR plot of PSSR values in various cases at a regulator.
Figure 4B:
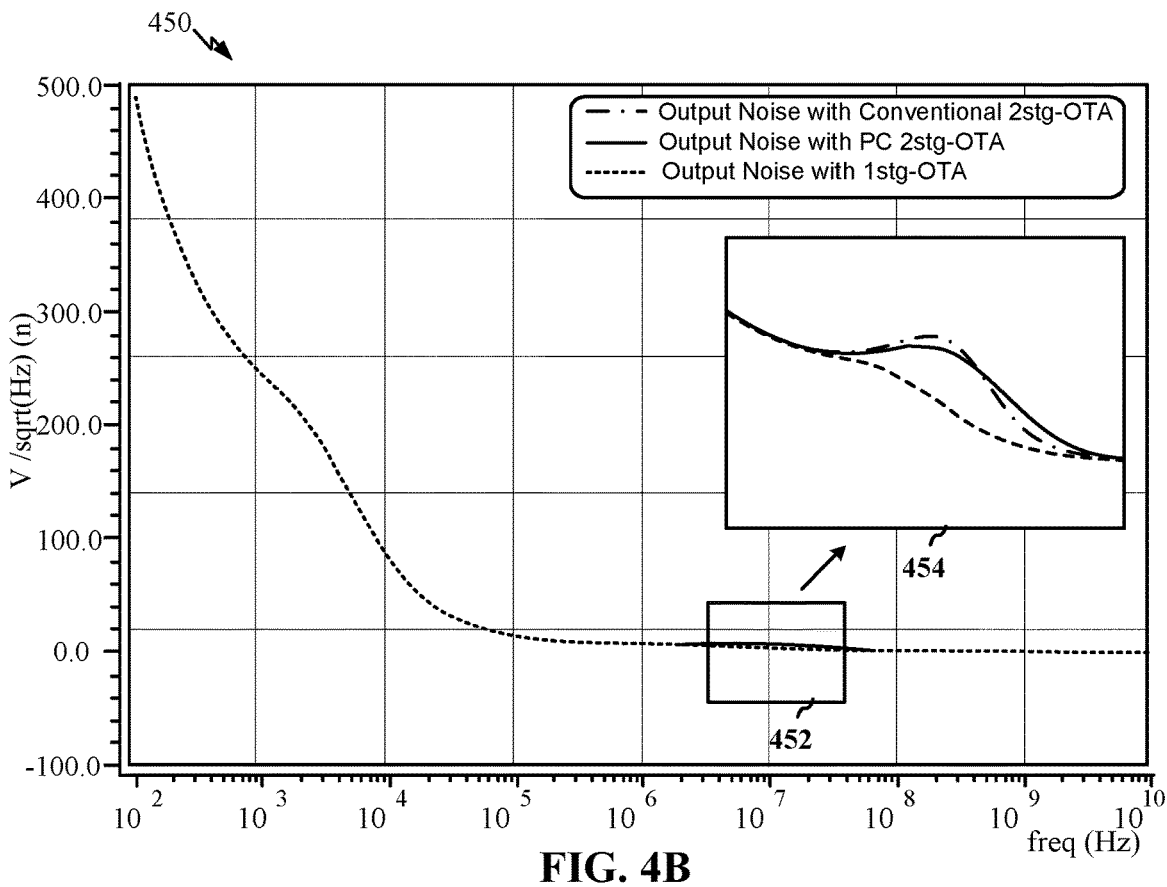
FIG. 4B is an example noise plot of noise values in various cases.

FIG. 4A is an example PSSR plot 400 of PSSR values in various cases at a regulator. The PSSR plot 400 illustrates that the pole cancellation (PC) 2-stage OTA regulator circuit provides a PSSR plot that is closer to the desirable PSSR of −100 dB than the PSSR plots of a 1-stage OTA regulator and a conventional 2-stage OTA regulator. Thus, the pole cancellation provided by the 2-stage OTA regulator circuit of the disclosure (e.g., via the NMOS regulator of FIG. 3) helps extend the bandwidth of the PSSR. The more power the 2-stage OTA regular circuit provides, the wider the PSSR bandwidth is. FIG. 4B is an example noise plot 450 of noise values in various cases. According to the example noise plot 450, the noise plot of the PC 2-stage OTA regulator circuit is similar to the noise plots of a 1-stage OTA regulator and a conventional 2-stage OTA regulator, except for a portion 452. The portion 452 of the example noise plot 450 is zoomed to a zoomed portion 454. The zoomed portion 454 indicates that both the PC 2-stage OTA regulator circuit and the conventional 2-stage OTA regular circuit experience slightly higher noise than the 1-stage OTA regular circuit.

Figure 5:
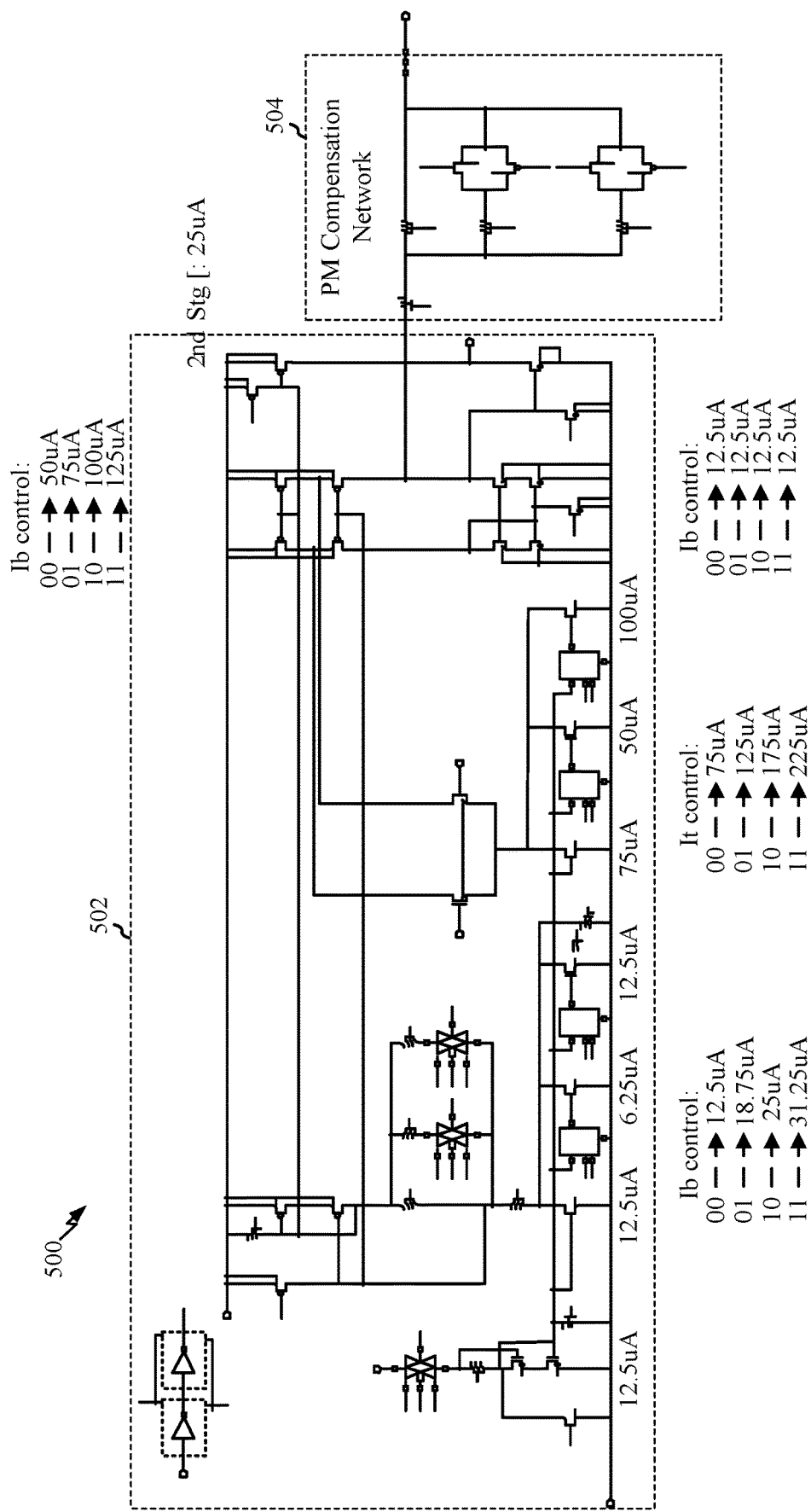
FIG. 5 is an example implementation circuit of an NMOS regulator according to the disclosure.

FIG. 5 is an example implementation circuit 500 of the NMOS regulator according to the disclosure. The NMOS regulator 500 includes a two-stage OTA circuit 502 including two OTAs and a compensation network including a resistor and a capacitor. In an aspect, the two-stage OTA circuit 502 may be equivalent to the two-stage OTA circuit including the first amplifier 304 and the second amplifier 306 in FIG. 3. In an aspect, the compensation network 504 may be equivalent to the compensation network including the capacitor 308 and the resistor 310 in FIG. 3. The compensation network 504 may be tunable to match with a first stage OTA circuit of the two-stage OTA circuit 502.

According to the disclosure, a regulator circuit may be a complementary metal-oxide-semiconductor (CMOS) regulator circuit that includes a PMOS regulator and an NMOS regulator, where the NMOS regulator is coupled to the PMOS regulator. In one aspect, the PMOS regulator may be connected to the NMOS regulator in series (in cascode). In another aspect, the PMOS regulator may be connected to the NMOS regulator in parallel. The regulator circuit may be connected to a switch circuit to selectively choose an HV mode or an LV mode for the CMOS regulator circuit. In general, for the VCO, the HV mode may be used for better performance in terms of less pulling effect and better phase noise performance. However, the HV mode may cause higher power consumption. The LV mode generally causes lower power consumption than the HV mode. It is noted that the VCO is less sensitive to electromagnetic (EM) coupling in the HV mode. In one aspect, the switch circuit may select the HV mode for the PMOS regulator and bypass the NMOS regulator. In another aspect, for the LV mode, the switch circuit may select either the NMOS regulator and bypass the PMOS regulator, or may select both the PMOS regulator and the NMOS regulator. In addition, it is noted that the PMOS regulator and the NMOS regulator have different input impedance and output impedance. The PMOs regulator generally has lower input impedance and higher output impedance than the NMOS regulator. Thus, in one aspect, the switch circuit may be used to select either the PMOS regulator or the NMOS regulator, depending on whether the VCO is an aggressor or a victim to surrounding building blocks. For example, the switch circuit may select the PMOS regulator if the VCO is an aggressor that may affect the surrounding building blocks (e.g., by pulling the surrounding building blocks). For example, the switch circuit may select the NMOS regulator if the VCO is a victim that may be affected by the surrounding building blocks (e.g., by being pulled by the surrounding building blocks). It is further noted that selecting both the PMOS regulator and the NMOS regulator that are connected in series would also provide isolation from affecting and/or being affected from the surrounding building blocks.

Figure 6B:
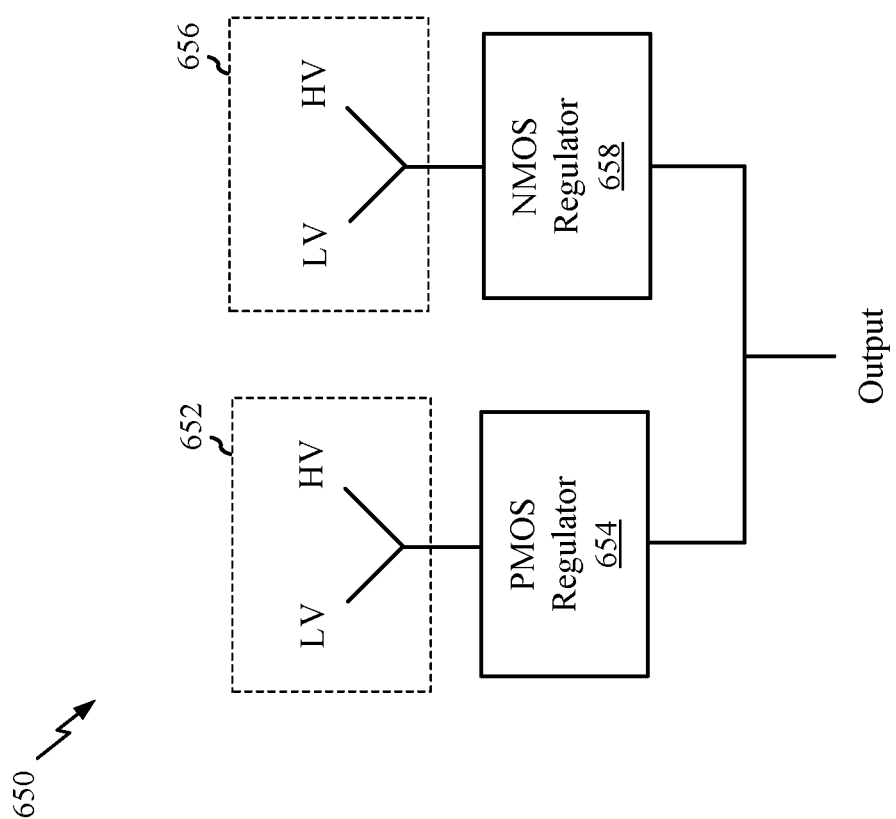
FIGS. 6A-6B are example structures of a CMOS regulator.
Figure 6A:
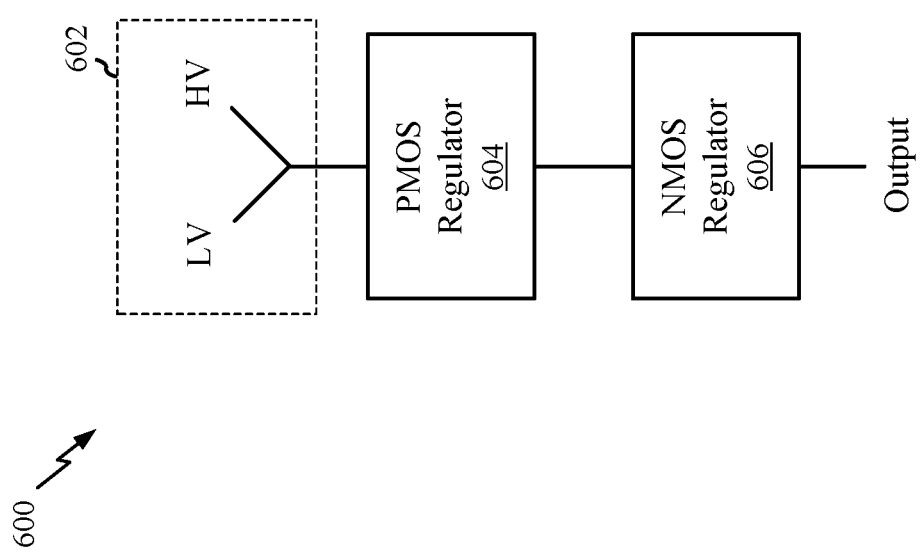

FIGS. 6A-6B are example structures of a CMOS regulator. FIG. 6A is an example structure 600 of a CMOS regulator where a PMOS regulator 604 and an NMOS regulator 606 are connected in series. In particular, a switch circuit 602 is connected to the PMOS regulator 604 that is connected to the NMOS regulator 606 in series. The switch circuit 602 is configured to select one of an LV mode and an HV mode. As discussed supra, for example, the LV mode is used to supply low voltage for a non-GSM mode, and the HV mode is used to supply high voltage for a GSM mode. Although not shown, in another example, the order of the PMOS regulator 604 and the NMOS regulator 606 may be different from the example structure 600 of FIG. 6A. The CMOS regulator includes a PMOS regulator and an NMOS regulator. FIG. 6B is an example structure 650 of a CMOS regulator where a PMOS regulator 654 and an NMOS regulator 658 are connected in parallel. In particular, a first switch circuit 652 is connected to the PMOS regulator 654 and a second switch circuit 656 is connected to the NMOS regulator 658, where the PMOS regulator 654 and the NMOS regulator 658 are connected in parallel. As discussed supra, for example, the LV mode is used to supply low voltage for a non-GSM mode, and the HV mode is used to supply high voltage for a GSM mode. Thus, if the LV mode is used, both the first switch circuit 652 and the second switch circuit 656 are configured to provide low voltage. If the HV mode is used, both the first switch circuit 652 and the second switch circuit 656 are configured to provide high voltage.

Figure 7:
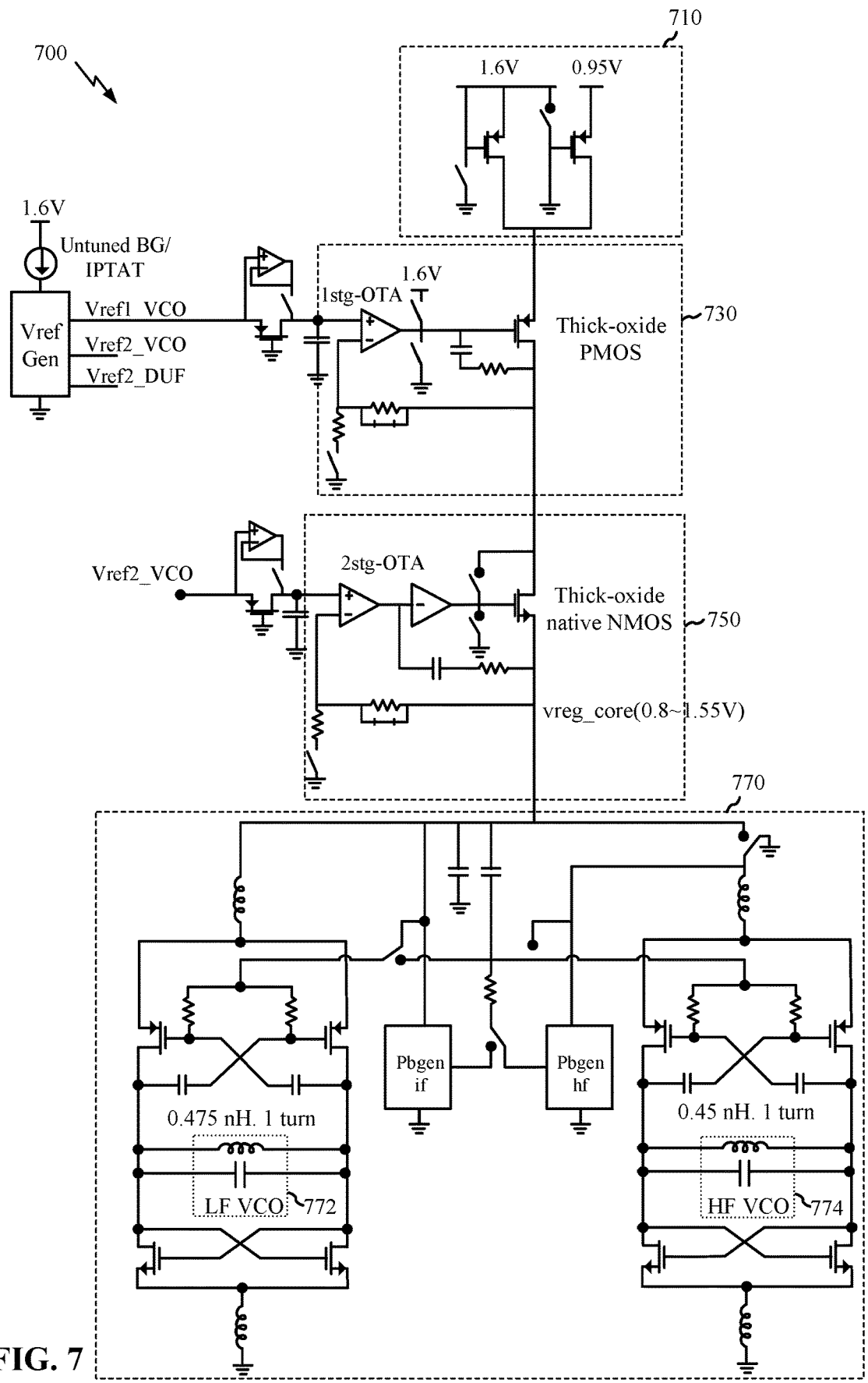
FIG. 7 is an example circuit diagram including a cascode CMOS regulator.

FIG. 7 is an example circuit diagram 700 including a cascode CMOS regulator. In particular, a switch circuit 710 is connected to a CMOS regulator that includes a PMOS regulator 730 and an NMOS regulator 750, where the PMOS regulator 730 and the NMOS regulator 750 are connected in series (cascode). The CMOS regulator is connected to a VCO circuit 770 via the NMOS regulator 750. The VCO circuit 770 may be equivalent to the VCO 274 or the VCO 284 of FIG. 2. The VCO circuit 770 may have a low frequency (LF) VCO output at 772 and a high frequency (HF) VCO output at 774. In an aspect, the switch circuit 710 may selectively supply either a voltage of an HV mode or a voltage of an LV mode for the CMOS regulator. In the example of FIG. 7, the switch circuit 710 may supply the HV mode voltage of 1.6V or the LV mode voltage of 0.95V to the CMOS regulator. The switch circuit 710 may selectively supply either a voltage of the HV mode or a voltage of the LV mode depending on various factors such as following. The HV mode may provide better VCO phase noise and swing as well as better VCO buffer phase noise and swing than the LV mode. The LV mode may cause lower power consumption than the HV mode. The supply voltage domain of the voltage supplied to the CMOS regulator may be configured to experience less supply coupling. It is also noted that the VCO is less sensitive to EM coupling in the HV mode than in the LV mode.

In an aspect, the NMOS regulator 750 has a better PSRR at 100 MHz than the PMOS regulator 730. In an aspect, the PMOS regulator 730 may have better noise performance (e.g., lower noise) at 100 MHz (e.g., in GSM, HV and low PMOS regulator BW) than the NMOS regulator 750. In the example of FIG. 7, the PMOS regulator 730 can output Vdd=−50 mV. In the example of FIG. 7, the NMOS regulator 750 can achieve a PSRR of 100 dB at 1 MHz with 100 mV drop-out. For example, the NMOS regulator 750 has a two-stage OTA and pole cancellation features to achieve a PSRR of 100 dB at 1 MHz for PFM spurs.

Figure 8:
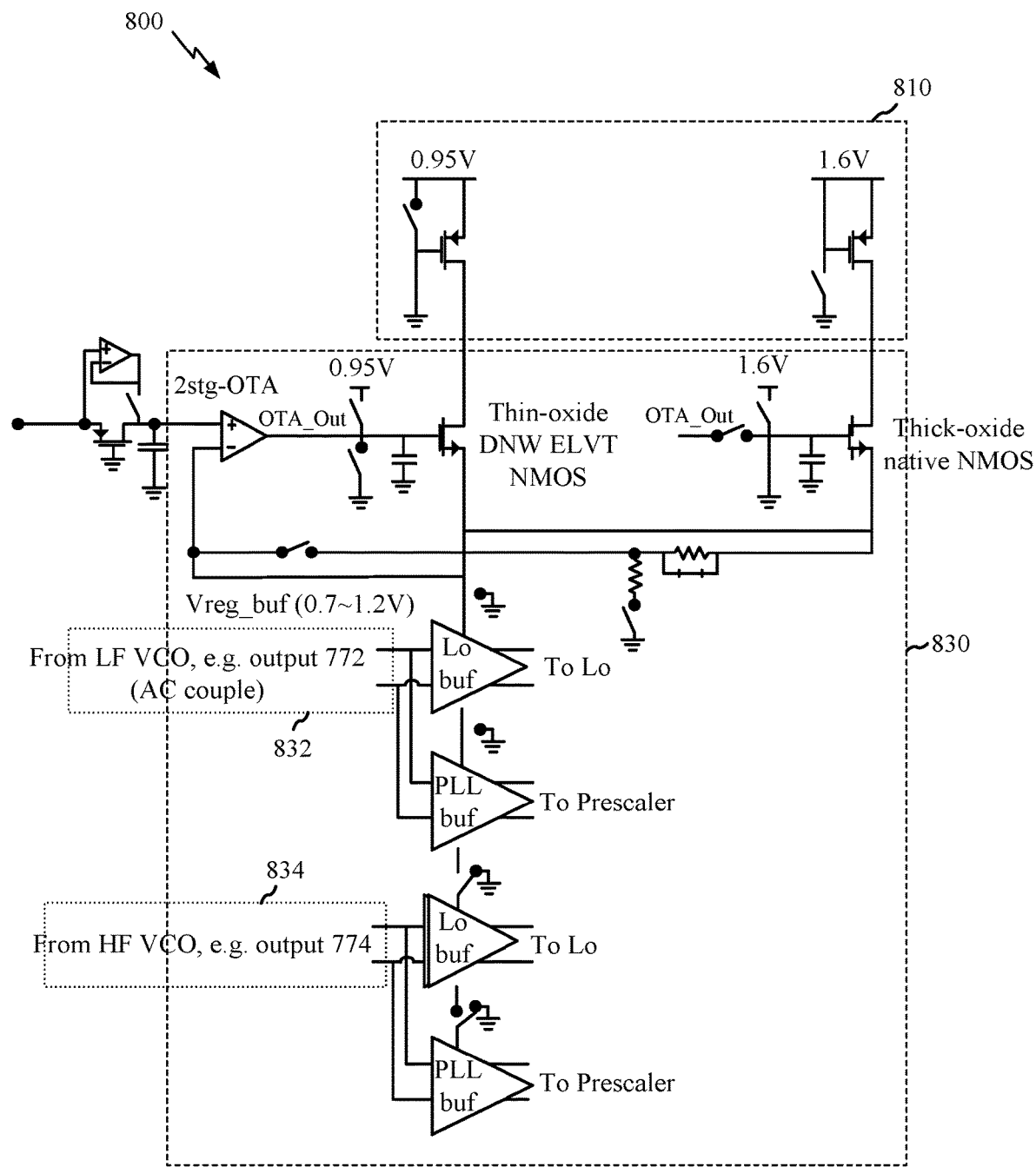
FIG. 8 is an example circuit diagram including a buffer circuit.

FIG. 8 is an example circuit diagram 800 including a buffer circuit. In the example circuit diagram 800, a switch circuit 810 is connected to a buffer circuit 830. In an aspect, the switch circuit 810 may selectively provide either an HV mode or an LV mode. The buffer circuit 830 receives outputs from the VCO, such as the VCO circuit 770 of FIG. 7, and buffers the outputs. Thus, the buffer circuit 830 may be connected to the VCO circuit 770 of FIG. 7. For example, the LF VCO input 832 into the buffer circuit 830 may be from the LF VCO output 772 of FIG. 7, and the HF VCO input 834 into the buffer circuit 830 may be from the HF VCO output 774 of FIG. 7.

Figure 9:
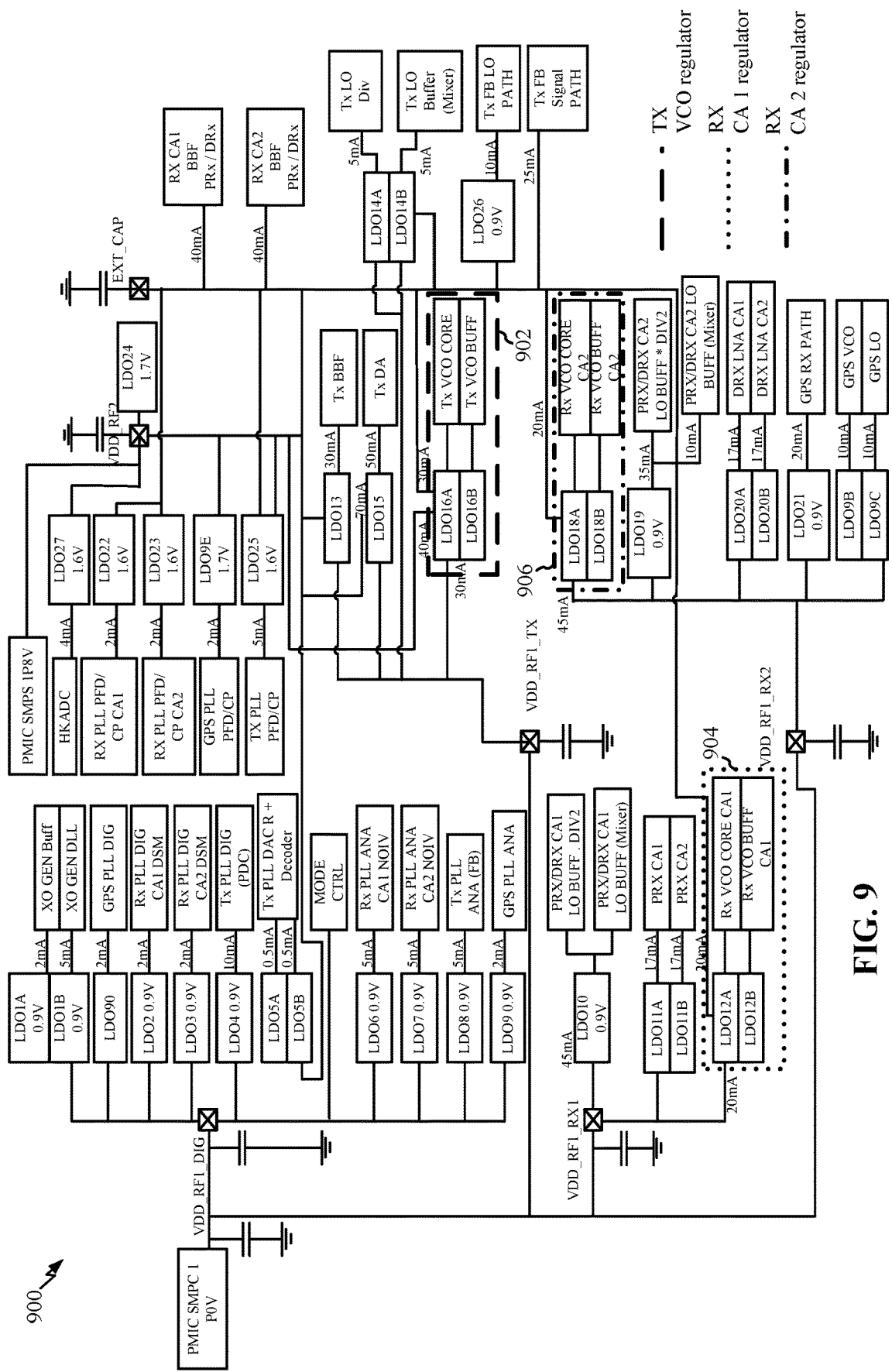
FIG. 9 is an example circuit structure at a system level according to the disclosure.

FIG. 9 is an example circuit structure 900 at a system level according to the disclosure. The example circuit structure 900 includes a transmission (TX) VCO regulator 902, a first reception (RX) carrier aggregation (CA) regulator 904, and a second RX CA regulator 906. The first RX CA regulator 904 is for receiving carrier aggregation at a first frequency, and the second RX CA regulator 906 is for receiving carrier aggregation at a second frequency. Each one of the TX VCO regulator 902, the first RX CA regulator 904, and the second RX CA regulator 906 includes a CMOS regulator structure having a PMOS regulator coupled to an NMOS regulator.

Figure 10A:
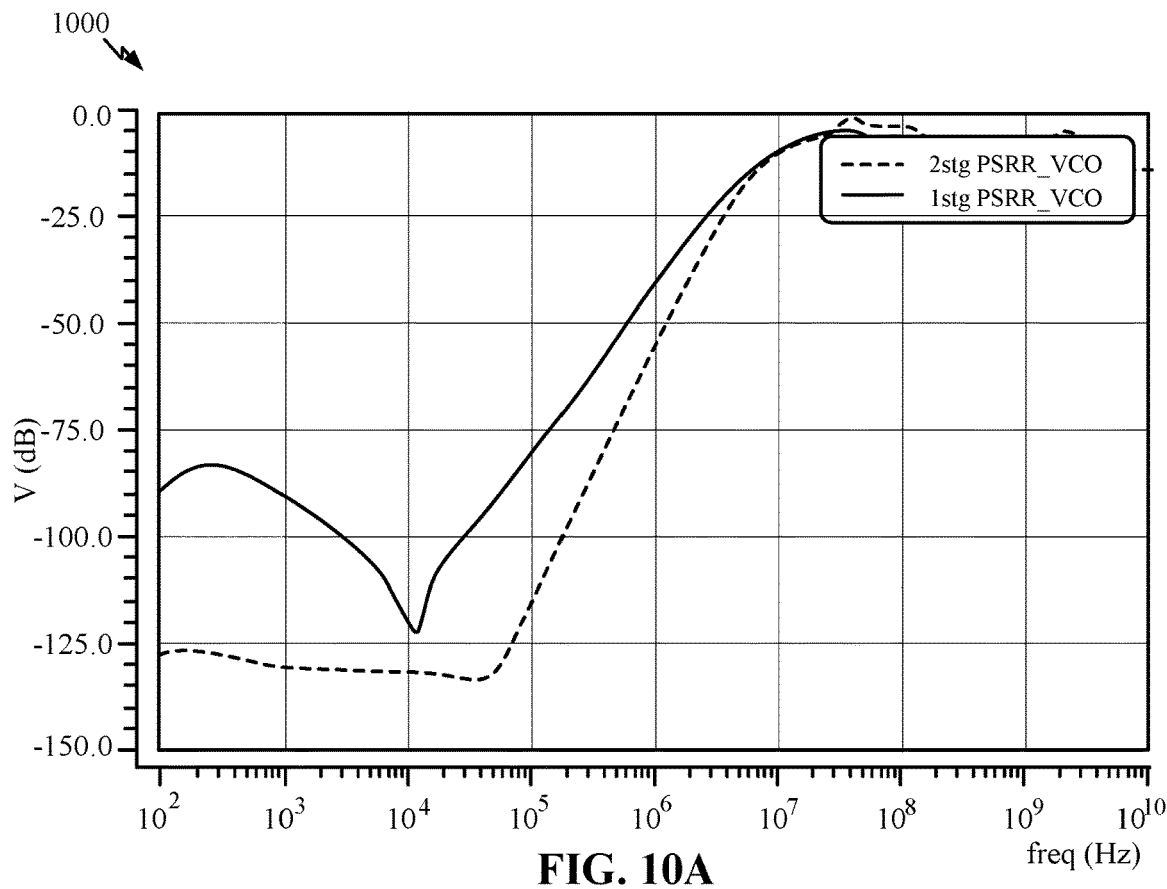
FIG. 10A is an example PSSR plot of PSSR values in various cases at a VCO.
Figure 10B:
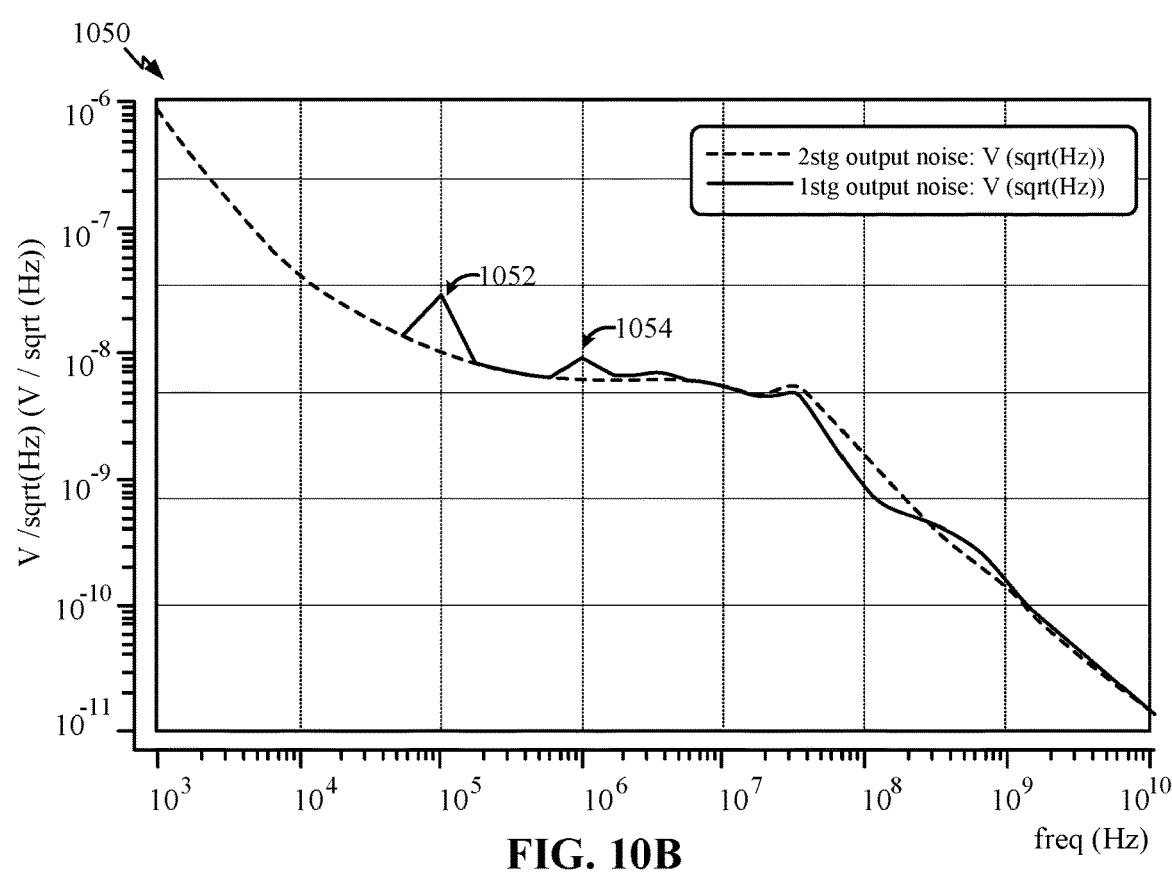
FIG. 10B is an example noise plot of noise values in various cases at a VCO.

FIG. 10A is an example PSSR plot 1000 of PSSR values in various cases at a VCO. The PSSR plot 1000 illustrates that a 2-stage OTA regulator circuit provides a PSSR plot for the VCO that is closer to the desirable PSSR of −100 dB than the PSSR plots of a 1-stage OTA regulator. Thus, the PSRR of 100 dB at 100 kHZ is achieved by the 2-stage OTA regulator. Further, according to FIG. 10A, the VCO may also experience 50 dB improvement when the 2-stage OTA regulator is used. FIG. 10B is an example noise plot 1050 of noise values in various cases at a VCO. According to the example noise plot 1050, the noise plot of the 1-stage OTA regulator has spurs 1052 and 1054, whereas the noise plot of a 2-stage OTA regulator does not have spurs. Thus, the VCO experiences spur reduction when the 2-stage OTA regulator is used. In addition, if the VCO VDD switches to a high-supply domain, 4-5 dB reference side band (RSB) improvement may be provided.

Figure 11:
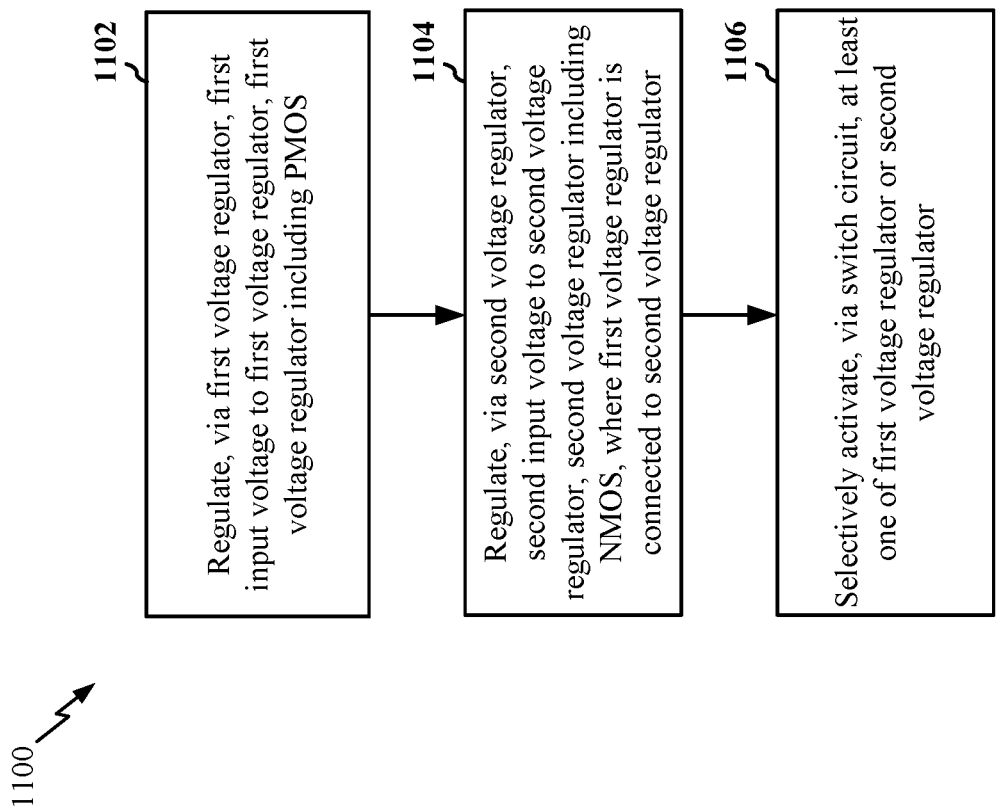
FIG. 11 is a flow chart of a method by a regulator circuit.

FIG. 11 is a flow chart 1100 of a method by a regulator circuit. The method may be performed by a regulator circuit (e.g., the regulator circuit 600, 650, the apparatus 1202/1202'). At 1102, the regulator circuit regulates, via a first voltage regulator, a first input voltage to the first voltage regulator, the first voltage regulator including a PMOS. At 1104, the regulator circuit regulates, via a second voltage regulator, a second input voltage to the second voltage regulator, the second voltage regulator including an NMOS, where the first voltage regulator is connected to the second voltage regulator. At 1106, the regulator circuit selectively activates, via a switch circuit, at least one of the first voltage regulator or the second voltage regulator. In an aspect, the at least one of the first voltage regulator or the second voltage regulator is selectively activated based on noise.

Figure 12:
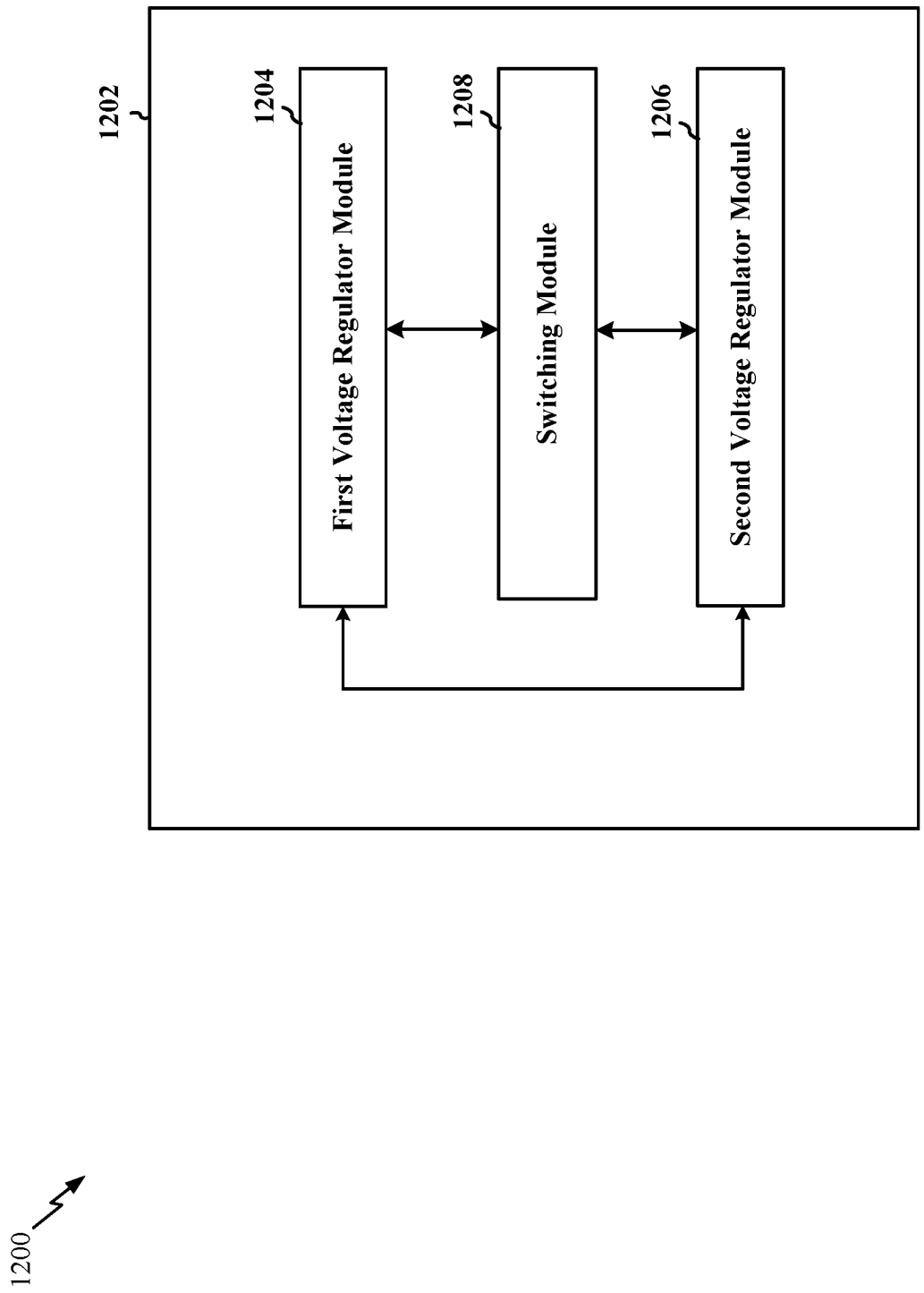
FIG. 12 is a conceptual data flow diagram illustrating the data flow between different modules/means/components in an exemplary apparatus.

FIG. 12 is a conceptual data flow diagram 1200 illustrating the data flow between different modules/means/components in an exemplary apparatus 1202. The apparatus may be a regulator circuit. The apparatus includes a first voltage regulator module 1204, a second voltage regulator module 1206, and a switching module 1208.

The first voltage regulator module 1204 regulates a first input voltage to the first voltage regulator module 1204. In an aspect, the first voltage regulator module 1204 includes a PMOS. The second voltage regulator module 1206 regulates a second input voltage to the second voltage regulator module 1206. In an aspect, the second voltage regulator module 1206 includes an NMOS. In an aspect, the first voltage regulator is connected to the second voltage regulator. The switching module 1208 selectively activates at least one of the first voltage regulator module 1204 or the second voltage regulator module 1206. In an aspect, the at least one of the first voltage regulator module 1204 or the second voltage regulator 1206 is selectively activated based on noise.

The apparatus may include additional modules that perform each of the blocks of the algorithm in the aforementioned flow charts of FIG. 11. As such, each block in the aforementioned flow charts of FIG. 11 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 13:
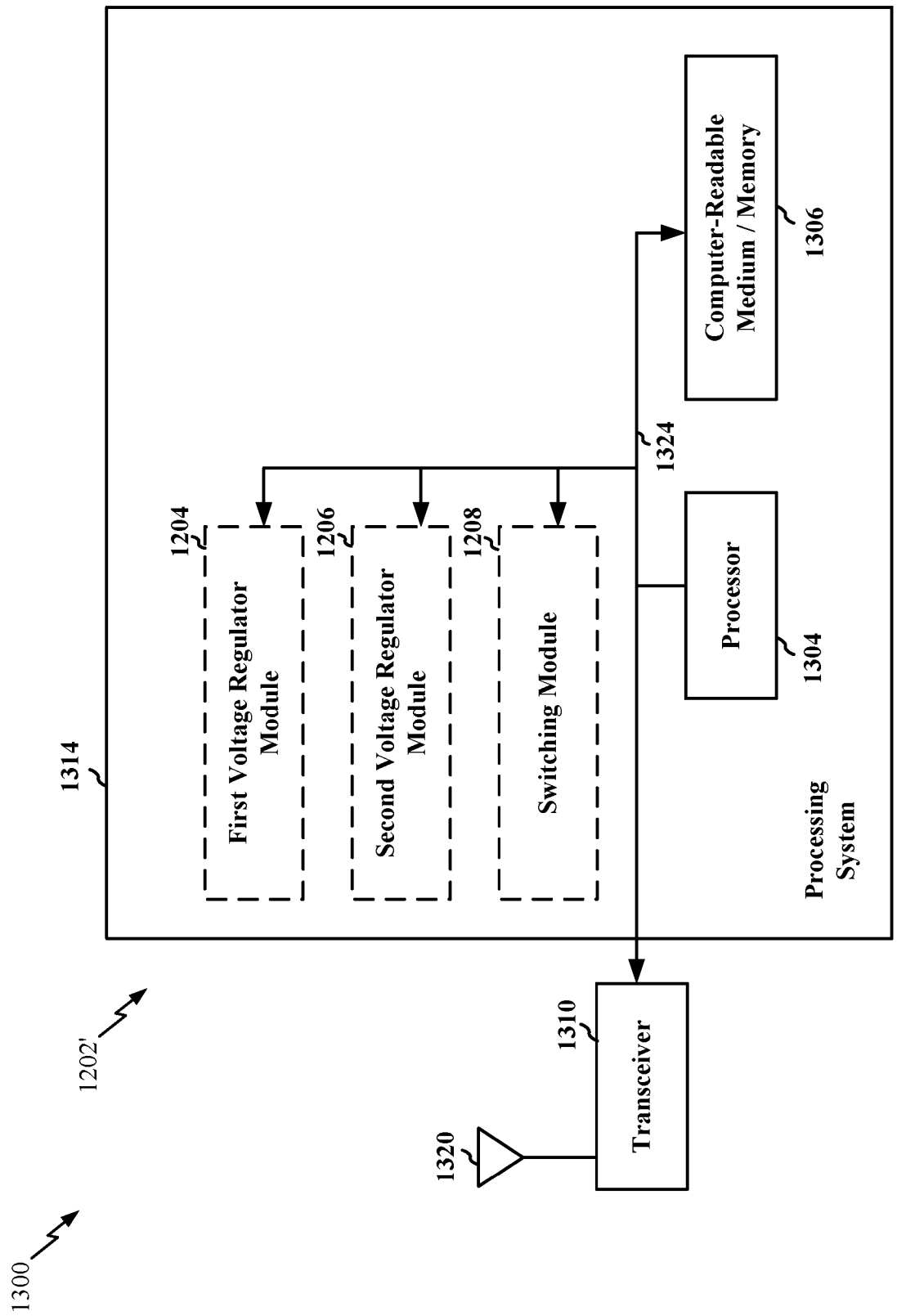
FIG. 13 is a diagram illustrating an example of a hardware implementation for an apparatus employing a processing system.

FIG. 13 is a diagram 1300 illustrating an example of a hardware implementation for an apparatus 1202' employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware modules, represented by the processor 1304, the modules 1204, 1206, 1208, and the computer-readable medium/memory 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The transceiver 1310 receives a signal from the one or more antennas 1320, extracts information from the received signal, and provides the extracted information to the processing system 1314. In addition, the transceiver 1310 receives information from the processing system 1314, and based on the received information, generates a signal to be applied to the one or more antennas 1320. The processing system 1314 includes a processor 1304 coupled to a computer-readable medium/memory 1306. The processor 1304 is responsible for general processing, including the execution of software stored on the computer-readable medium/memory 1306. The software, when executed by the processor 1304, causes the processing system 1314 to perform the various functions described supra for any particular apparatus. The computer-readable medium/memory 1306 may also be used for storing data that is manipulated by the processor 1304 when executing software. The processing system further includes at least one of the modules 1204, 1206, and 1208. The modules may be software modules running in the processor 1304, resident/stored in the computer readable medium/memory 1306, one or more hardware modules coupled to the processor 1304, or some combination thereof.

In one configuration, the apparatus 1202/1202' includes means for regulating a first input voltage to the means for regulating the first input voltage, the means for regulating the first input voltage including a PMOS, means for regulating a second input voltage to the means for regulating the second voltage, the means for regulating the second voltage including an NMOS, where the means for regulating the first input voltage is connected to the means for regulating the second voltage, and means for selectively activating at least one of the means for regulating the first input voltage or the means for regulating the second voltage. In an aspect, the means for selectively activating is configured to selectively activate at least one of the means for regulating the first input voltage or the means for regulating the second voltage based on noise. The aforementioned means may be one or more of the aforementioned modules of the apparatus 1202 and/or the processing system 1314 of the apparatus 1202' configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A regulator circuit, comprising:
a first voltage regulator to regulate a first input voltage to the first voltage regulator, the first voltage regulator including a P-type metal-oxide-semiconductor (PMOS);
a second voltage regulator to regulate a second input voltage to the second voltage regulator, the second voltage regulator including an N-type metal-oxide-semiconductor (NMOS), wherein the second voltage regulator comprises a two-stage Operational Transconductance Amplifier (OTA) circuit, and wherein the first voltage regulator is connected to the second voltage regulator; and
a switch circuit to selectively activate at least one of the first voltage regulator or the second voltage regulator.

2. The regulator circuit of claim 1, wherein the two-stage OTA circuit provides pole cancellation.

3. The regulator circuit of claim 2, wherein the two-stage OTA circuit comprises:
a first amplifier;
a second amplifier, wherein an output of the first amplifier is connected to an input of the second amplifier; and
a compensation network connected to a source of the NMOS.

4. The regulator circuit of claim 3, wherein the compensation network is tunable.

5. The regulator circuit of claim 4, wherein the compensation network comprises:
a capacitor; and
a resistor in series with the capacitor.

6. The regulator circuit of claim 5, wherein the output of the first amplifier is connected to a first end of the capacitor, a second end of the capacitor is connected to a first end of the resistor, and wherein a second end of the resistor is connected to the source of the NMOS.

7. The regulator circuit of claim 1, wherein the first voltage regulator and the second voltage regulator are connected in series.

8. The regulator circuit of claim 7, wherein a drain of the PMOS is coupled to a drain of the NMOS.

9. The regulator circuit of claim 1, wherein the first voltage regulator and the second voltage regulator are connected in parallel.

10. The regulator circuit of claim 1, wherein the first voltage regulator and the second voltage regulator are tunable to change a degree of input voltage regulation.

11. The regulator circuit of claim 1, wherein the first voltage regulator and the second voltage regulator have different input impedance and output impedance.

12. The regulator circuit of claim 1, wherein the first voltage regulator comprises a 1-stage operational transconductance amplifier (OTA).

13. The regulator circuit of claim 1, wherein the switch circuit is programmable to select either i) both the first voltage regulator and the second voltage regulator or ii) one of the first voltage regulator and the second voltage regulator and bypass the other of the first voltage regulator and the second voltage regulator.

14. The regulator circuit of claim 1, wherein the regulator circuit is adapted to select one of the first voltage regulator or the second voltage regulator based on at least one of a noise bandwidth or a Power Supply Rejection Ratio (PSRR) wherein in particular the second voltage regulator provides for better PSRR than the first voltage regulator.

15. The regulator circuit of claim 1, further comprising a Voltage Controlled Oscillator (VCO), and wherein the regulator circuit is configured to regulate a supply voltage to the VCO.

16. The regulator circuit of claim 15, wherein the regulator circuit is adapted to select the supply voltage of the regulator circuit based on a frequency of the VCO.

17. The regulator circuit of claim 15, wherein the regulator circuit is adapted to select the supply voltage of the regulator circuit based on a power consumption of the VCO.

* * * * *